(12) United States Patent
Hegenbart et al.

(10) Patent No.: US 11,505,334 B2
(45) Date of Patent: Nov. 22, 2022

(54) INSTALLATION SYSTEM FOR A CABIN OF A VEHICLE

(71) Applicant: Airbus Operations GmbH, Hamburg (DE)

(72) Inventors: Matthias Hegenbart, Hamburg (DE); Alexander Horn, Hamburg (DE); Marcus Hinrichs, Hamburg (DE); Thorsten Otto, Hamburg (DE); Ingo Roth, Hamburg (DE); Andreas Wietzke, Hamburg (DE)

(73) Assignee: Airbus Operations GmbH

( * ) Notice: Subject to any disclaimer, the term of this patent is extended or adjusted under 35 U.S.C. 154(b) by 235 days.

(21) Appl. No.: 16/835,550

(22) Filed: Mar. 31, 2020

(65) Prior Publication Data
US 2020/0324918 A1   Oct. 15, 2020

(30) Foreign Application Priority Data
Apr. 11, 2019   (DE) ...................... 10 2019 109 573.5

(51) Int. Cl.
  *B64F 5/10*    (2017.01)
  *B64F 5/50*    (2017.01)
  *B64C 1/06*    (2006.01)

(52) U.S. Cl.
  CPC .................. *B64F 5/10* (2017.01); *B64C 1/06* (2013.01); *B64F 5/50* (2017.01)

(58) Field of Classification Search
  CPC ...... B64F 5/10; B64F 5/50; B64C 1/06; F16B 1/0071; F16B 45/02; B64D 11/003; B64D 11/00
  See application file for complete search history.

(56) References Cited

U.S. PATENT DOCUMENTS 2,473,364 A    6/1949  Dickinson et al.
6,814,331 B2 * 11/2004  Hessling ................ B64C 1/066
                                                    244/119

(Continued)

FOREIGN PATENT DOCUMENTS

DE         3034546 A1    4/1981
DE     102006042337 B3    4/2008

(Continued)

OTHER PUBLICATIONS

Alamy Stock Photo: Schoenefeld, Germany, Interior of the A310 MRI of the Bundeswehr at the ILA 2014. May 20, 2014 Source: https://www.alamy.com/stock-photo-schoenefeld-germany-interior-of-the-a310-mri-of-the-bundeswehr-at-73920707.html. [Retrieved on Apr. 3, 2020].

(Continued)

*Primary Examiner* — Lawrence Averick
(74) *Attorney, Agent, or Firm* — Lerner, David, Littenberg, Krumholz & Mentlik, LLP

(57) ABSTRACT

An installation system for a cabin of a vehicle includes at least one built-in component for installation in the cabin, multiple base elements for arrangement on a structurally fixed component of the vehicle and multiple holding devices that can be connected to the at least one built-in component. The holding devices each include a clamping unit with receiving space defined by at least two clamping members, wherein the receiving space can be moved between an open and a closed state through movement of at least one of the clamping members in the direction of the other clamping member in each case and wherein the clamping unit is configured to move the at least one clamping member by pressing the clamping unit onto a base element when the receiving space is in the open state and thereby closing the receiving space including the base element.

11 Claims, 4 Drawing Sheets

(56) References Cited

U.S. PATENT DOCUMENTS

| | | | |
|---|---|---|---|
| 2003/0209632 A1* | 11/2003 | Hessling | B64C 1/066 244/119 |
| 2008/0055836 A1* | 3/2008 | Lamoree | B64D 11/003 361/837 |
| 2008/0061202 A1 | 3/2008 | Costabel et al. | |
| 2010/0074673 A1 | 3/2010 | Horst et al. | |
| 2012/0228425 A1 | 9/2012 | Schneider et al. | |
| 2014/0227021 A1 | 8/2014 | Kamen et al. | |

FOREIGN PATENT DOCUMENTS

| | | |
|---|---|---|
| DE | 102009028533 A1 | 2/2011 |
| DE | 102009028534 A1 | 2/2011 |
| EP | 2493760 B1 | 10/2013 |
| GB | 1504749 A | 3/1978 |
| GB | 2322402 A | 8/1998 |

OTHER PUBLICATIONS

B. Braun Melsungen AG: Systemprospekt Rettungsdienst. Stand Mar. 2016. Source: https://www.bbraun.de/content/dam/b-braun/de/website/produkte-undtherepien/ambulante-versorgung/rettungsdients/01_infusiionspumpen/9991155_Systemprospekt. Rettungsdienst_03_16_RGB.pdf [Retrieved on Mar. 4, 2020] (English summary attached).

\* cited by examiner

INSTALLATION SYSTEM FOR A CABIN OF A VEHICLE

FIELD OF THE INVENTION

The invention relates to an installation system for a cabin of a vehicle, a cabin of a vehicle and a vehicle having a cabin of this kind.

BACKGROUND OF THE INVENTION

Numerous fittings are normally present in cabins of vehicles used to transport passengers, such as commercial aircraft. In addition to passenger seats, these may also contain monuments in the form of toilets, galleys, storage spaces or mixed, modular-structured monuments. It is customary for the structure of a vehicle's fuselage to be fitted with a plurality of holding devices for this purpose which hold the respective fittings. Holding devices which are arranged on the floor, on side walls and in a ceiling area are known in the art.

DE 10 2009 028 533 A1 and DE 10 2009 028 534 A1 disclose fastening systems for the guiding and detachable fastening of a module in an aircraft on guide rails.

EP 2 493 760 B1 discloses a storage module, in particular a storage module with an integral supply channel for optimized assembly.

BRIEF SUMMARY OF THE INVENTION

An aspect of the invention proposes an alternative possibility for installing built-in components in a cabin of a vehicle, by means of which a particularly quick and nevertheless reliable installation of fixtures is made possible. In particular, an aspect of the invention facilitates automated installation.

An installation system for a cabin of a vehicle is proposed, comprising at least one built-in component for installation in the cabin, multiple base elements for arrangement on a structurally fixed component of the vehicle and multiple holding devices that can be connected to the at least one built-in component, wherein the holding devices each comprise a clamping unit with receiving space defined by at least two clamping members, wherein the receiving space can be moved between an open and a closed state through movement of at least one of the clamping members in the direction of the other clamping member in each case, and wherein the clamping unit is configured to move the at least one clamping member by pressing the clamping unit onto a base element when the receiving space is in the open state and thereby closing the receiving space including the base element.

The at least one built-in component may be any item of equipment which has to be attached in the cabin of the vehicle. The vehicle may be a transport means for passengers and, in particular, an aircraft, a rail vehicle, a road vehicle or a watercraft. The built-in component may preferably be provided for installation in a ceiling region of the cabin of the vehicle. Built-in components of this kind customarily require dedicated structure holders which are connected to the built-in components and the structure. However, these could be replaced at least in part by the holding devices in combination with the base elements. It is further conceivable for other built-in components which are fastened at least in part to seat or floor rails and, in addition, to base elements to be considered too.

The base elements may be of different designs and be arranged in the cabin. It is conceivable for elongated base elements to be used which extend in a particular spatial direction in the cabin. It is furthermore conceivable for these to be distributed in the spatial direction, wherein multiple base elements are arranged flush with one another or spaced apart from one another. The structurally fixed component need not necessarily be a structural component of the vehicle. It is conceivable for a first built-in component to be initially attached to base elements connected to the structure, so that the first built-in component should be regarded as a structurally fixed component. Further base elements can then be arranged on the first built-in component, so that second built-in components can be arranged thereon.

The holding devices form a kind of interface between the built-in component in each case and the base elements to which the built-in component has to be fastened. Built-in components can be reliably held on the base elements using the holding devices. The clamping unit on which a receiving space is defined by at least two clamping members which can receive the base element is provided for this purpose. The receiving space and the base element are consequently formed in a matching or corresponding manner to one another.

The clamping unit is configured by the design with at least one movable clamping member to bring the receiving space into an open state in which a base element can be introduced into the receiving space. The receiving space is then outwardly open and a clear width between the respective clamping members is sufficient to move the base element into the receiving space. When the base element enters the receiving space, the at least one clamping member is moved into a position in which the receiving space is closed. In the closed position, the clamping members concerned are so close to one another that the base element can no longer escape from the receiving space. The clamping unit is therefore fixed to the base element.

Consequently, a built-in component which is to be installed may be fitted with multiple holding devices which allow the built-in component to be fastened to a structurally fixed component. In order to install the built-in component, the base elements are initially introduced into the cabin. The built-in component is then introduced into the cabin via a guiding or lifting device, for example, and the holding devices are then positioned relative to the base elements so that the holding devices are then pressed onto the base elements. This means that the holding devices are fastened to the base elements. The work and time required to fasten the built-in component can be substantially reduced by this process. Furthermore, an at least partially automated process can be benefited.

In a preferred embodiment, the clamping unit comprises a sensor which is designed to detect the closed state of the clamping unit. The sensor could take the shape of an electrical contact which is only closed when the clamping unit is in the closed state. Alternatively, switches based on a magnetic mechanism are also conceivable which detect when two magnetic elements have reached a given relative position in a robust, contactless manner Other sensors which are able to indicate when a particular position between two mechanical elements has been reached can of course also be used. The sensor can be used to detect whether a complete fastening of the clamping unit to the appropriate base element has taken place. An automated or at least partially automated installation procedure in which the fastening of all holding devices is checked could thereby be benefited. It goes without saying that the sensors can also be used for a manual installation process in which assembly personnel, for example, are informed via a display unit of the respective state of a clamping unit. This may be appropriate if, in the case of pre-configured built-in components, no visual contact with the clamping unit is possible from outside.

The clamping members are particularly preferably configured to latch with one another in the closed state of the receiving space. When the closed state is reached, the clamping members therefore remain in the closed state. They could only be released from one another through manual action on the clamping members and a latching mechanism.

The at least one clamping member could comprise a closing lever in an advantageous embodiment which projects into the receiving space when said receiving space is in the open state, wherein the closing lever is designed to be pressed out of the receiving space when the clamping unit is pressed by the base element and thereby move the at least one clamping member to close the clamping unit. The closing lever may be fixedly connected to the at least one clamping member. The introduction of the base element into the receiving space causes the closing lever to be displaced from the receiving space. The displacement means that due to the connection to the at least one clamping member, the at least one clamping member is moved. The components are adapted to one another in such a manner that through the displacement of the closing lever, a movement of the at least one clamping member takes place to reach the closed position of the clamping unit.

The at least one clamping member is particularly preferably pivotably mounted and coupled to a spring unit, wherein the at least one clamping member can be moved into a first pivot position and a second pivot position opposite the first pivot position and wherein a mechanism formed from the spring unit and the at least one clamping member has a dead centre between the first pivot position and the second pivot position, so that the spring unit displaces the at least one clamping member into the first or second pivot position, depending on its position. The holding device can therefore be moved prior to installation into the open position, wherein the spring unit holds the at least one clamping unit in the first pivot position. This may lead to the open state of the clamping unit. By moving close to the base element and pressing, there is a movement of the at least one clamping member, wherein the dead centre is overcome. The spring unit then supports movement into the second pivot position. The spring unit may, in particular, be a compression spring which is pivotably coupled to the holding device at one end and to the at least one clamping member at the other.

More preferably, the at least one clamping member could be pivotably mounted about a pivot axle, wherein the pivot axle is spaced apart from two ends opposite one another of the at least one clamping member. As a result of this, the occupying of a dead centre is supported.

The base element could furthermore be an elongate, bar or pipe-like component. The base element may consequently have a uniform profile cross section which extends along a preferably straight section. A round cross section and, in particular, a circular cross section could simplify installation, since a particular orientation of the base element is not necessary and a holding device can engage around the base element from each direction.

In a particularly preferable embodiment, the base element has openings which are arranged in a grid and are designed to complement latching lugs of holding devices, so that a latching lug engages with an opening in the closed state of the holding device. In this way, a displacement along the extent of the base element can, in particular, be prevented. The positions of the built-in components are furthermore graded by the grid and are therefore easily adjustable.

In a particularly advantageous embodiment, the built-in component comprises an overhead storage compartment. The built-in component must therefore be arranged in a ceiling region. Numerous overhead storage compartments are customarily present, particularly in commercial aircraft, which compartments extend largely above the entire cabin. It is then particularly advantageous for the base elements to be arranged in a ceiling region, so that they are fastened to ribs, for example, and the holding devices on the overhead storage compartments do not have to be adapted to the rib grid.

The invention further relates to a cabin of a vehicle comprising a floor, two walls opposite one another, a ceiling region lying above the floor and an installation system according to the preceding description, wherein the base elements are arranged on the floor, the walls and/or the ceiling region. The base elements may be arranged parallel to one another. It may be preferable for all base elements to extend in the same spatial direction. It is also conceivable, however, for multiple base elements to be arranged transversely or obliquely in relation to other base elements. It is furthermore conceivable for base elements to conduct lateral or vertical pivots along their extent. Different equipment zones could therefore be realized. Demarcations of this kind may be configured as a simple hole, but also realized by transition sections.

The base elements are arranged on the ceiling region and support modules, wherein the modules have further base elements and support overhead storage compartments.

The invention further relates to a vehicle which has a cabin of this kind. The vehicle is preferably an aircraft.

BRIEF DESCRIPTION OF THE DRAWINGS

Further features, advantages and possible applications of the present invention result from the following description of the exemplary embodiments and the figures. All features described and/or figuratively depicted form the subject matter of the invention separately and in any combination, including independently of their composition in the individual claims or the appendancies thereof. Furthermore, the same reference numbers denote the same or similar objects in the figures.

DETAILED DESCRIPTION

Figure 1:
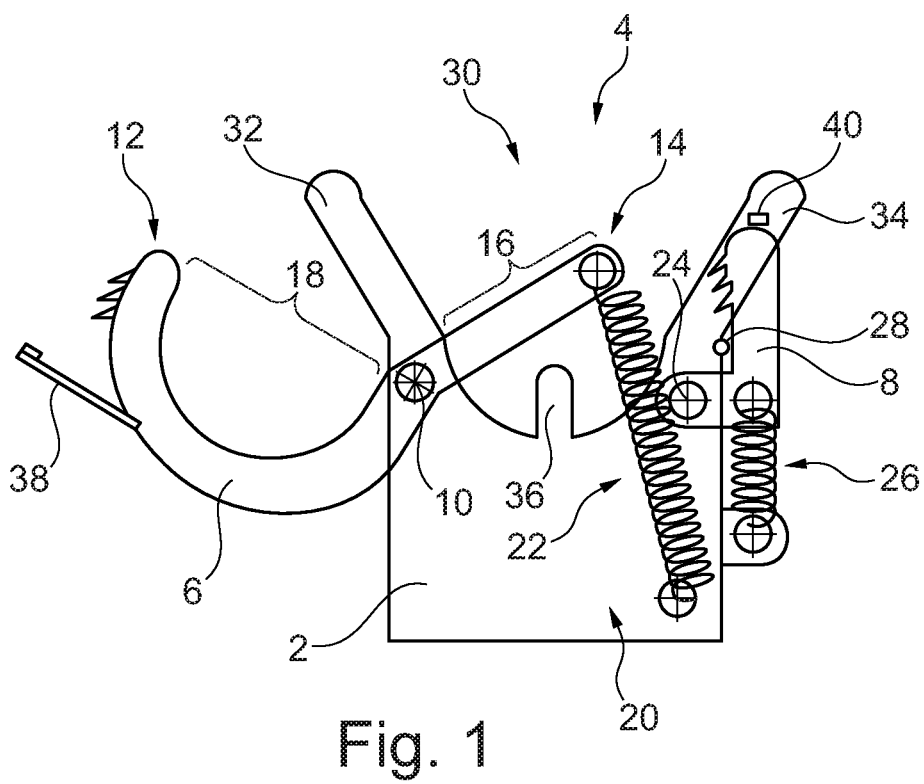
FIG. 1 to FIG. 5 show a holding device in different states in a schematic representation.

FIG. 1 shows a holding device 2 which comprises a clamping unit 4. The clamping unit 4 comprises a first clamping member 6 and a second clamping member 8. The first clamping member 6 is pivotably mounted on a first pivot axle 10. The pivot axle 10 is spaced apart from a first end 12 and a second end 14 of the first clamping member 6. The first clamping member 6 has a straight section 16 between the second end 14 and the first pivot axle 10. A curved portion 18 is provided between the first end 12 and the pivot axle 10.

Moreover, the holding device 2 comprises a base 20 which is connectable to a built-in component. A first spring unit 22 in the form of a compression spring is coupled to the base 20 and the second end 14 of the first clamping member 6. In the open state depicted in FIG. 1, the first clamping member 6 is pressed into an open position through the action of the first spring unit 22. The second end 14 in this case projects further beyond the base 20.

The second clamping member 8 is pivotably arranged on the base 20 with a second pivot axle 24 and is pressed by a second spring unit 26 onto an abutment 28 connected to the base 20. The second clamping member 8 has a substantially L-shaped design. A receiving space 30 is defined between the first clamping member 6 and the second clamping member 8, in which receiving space a base element (see following figures) can be received. The receiving space 30 has, by way of example, two guiding limbs 32 and 34 which serve to introduce the base element into the receiving space 30 and are arranged at an angle of approximately 60 to 70° relative to one another.

A latching lug 36 is arranged at an inner end of the receiving space 30, said latching lug being able to latch with the base element. The figures shown further below illustrate how the base element can be introduced into the receiving space 30. The first clamping member 6 and the second clamping member 8 have sensor mechanisms 38 and 40 which together form a sensor 41 (see FIG. 5) which detects when the first clamping member 6 moves close to the second clamping member 8.

Figure 2:
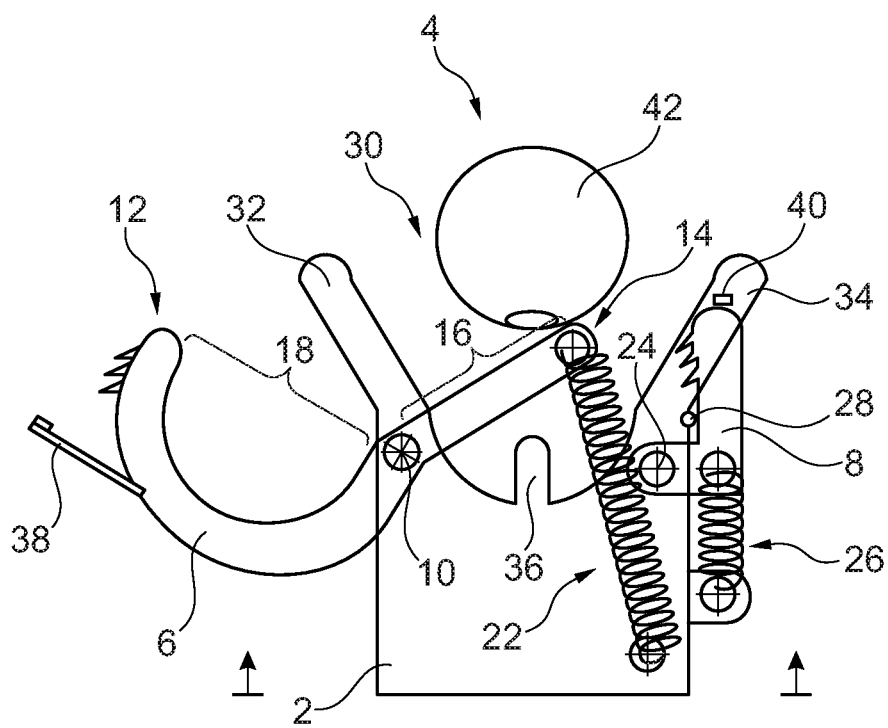

FIG. 2 shows the holding device 2 in the same state as in FIG. 1. A base element 42 is shown here in addition. Only a cross-sectional surface which is circular, for example, can be seen in the depiction in FIG. 2. The base element 42 may therefore be a bar or pipe-like component. This must be arranged on a structurally fixed component, so that the holding device 2 can be attached thereto. The holding device 2 is moved closer to the base element 42 for this purpose, so that said base element can enter the receiving space 30. In FIG. 2 the base element 42 is in contact with the straight portion 16 of the first clamping member 6. The straight portion 16 forms a closing lever. If the holding device 2 is moved closer to the base element 42, a force is exerted on the straight portion 16 proximate to the second end 14, so that the clamping member 6 pivots in a clockwise direction about the first pivot axle 10 and the curved portion 18 lies about the base element 42.

Figure 3:
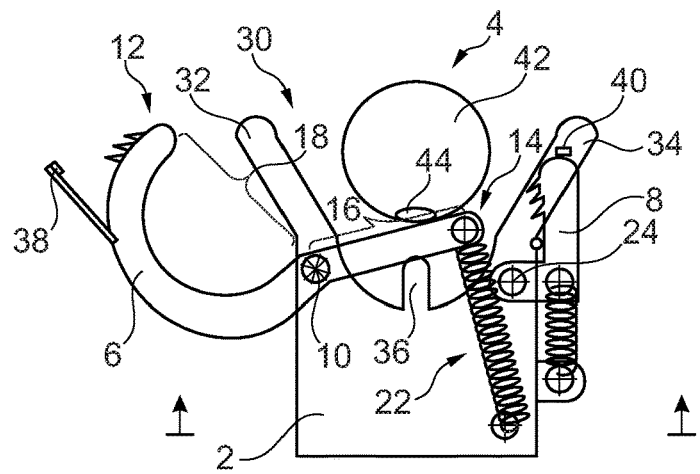

A movement to be used is depicted in FIG. 3. In this case, the first clamping member 6 is already pivoted slightly about the first pivot axle 10, wherein the first spring unit 22 is slightly compressed by the moving second end 14.

Figure 4:
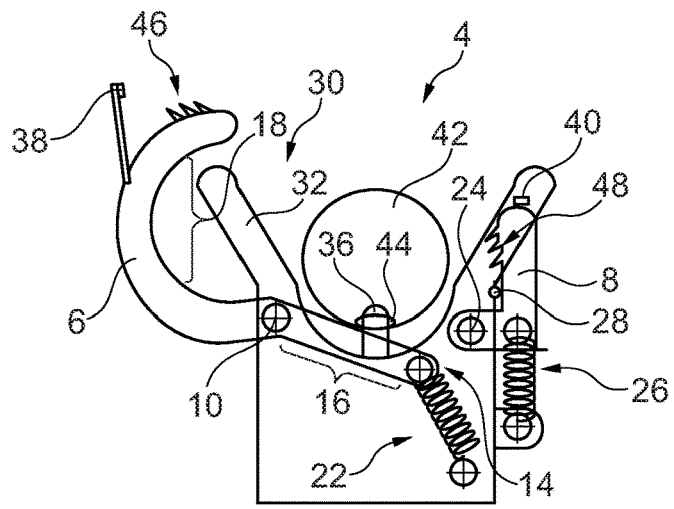

In FIG. 4 the base element 42 is located almost completely in the receiving space 30, wherein an opening 44 of the base element 42 creates a form-fitted connection with the latching lug 36. The second end 14 presses the first spring unit 22 very tightly together, so that the straight portion 16 and the first spring unit 22 stand just in front of the dead centre in which the straight portion 16 and the first spring unit 22 form a joint straight line.

Figure 5:
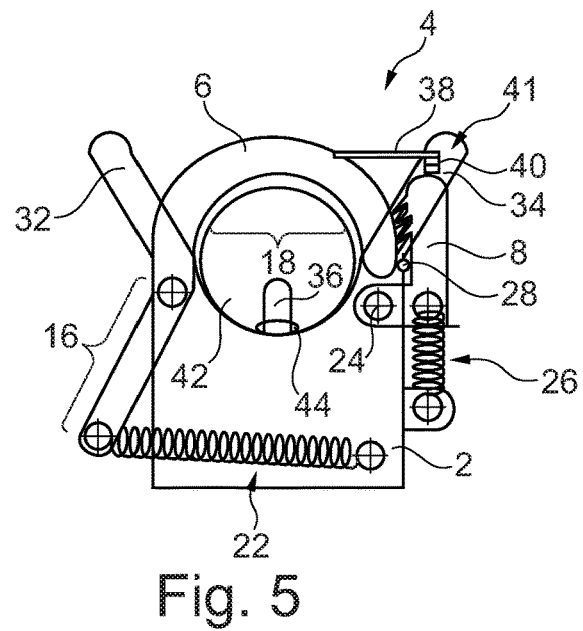

The dead centre is overcome in FIG. 5, so that the first spring unit 22 presses the second end 14 in the other direction. This means that the first clamping member 6 is completely pivoted about the receiving space 30 and moves in a completely closed position into an abutment with the base 20. The first clamping member 6 is then held in this position by the first spring unit 22. Radially external first latching elements 46 engage with second latching elements 48 of the second clamping member 8, so that a connection between the first clamping member 6 and the second clamping member 8 is created. When the engagement is formed between the two clamping members 6 and 8, the second spring unit 26 is briefly compressed and then fixes the second clamping member 8 in the latched position.

The holding device 2 can therefore automatically adopt a closed state in FIG. 5 in which the holding device 2 is held by means of the clamping unit 4 on the base element 42 when the holding device 2 moves close to the base element 42. The two sensor devices 38 and 40 of the sensor 41 lie on top of one another and can reliably detect this position, for example by triggering a contact. Through a corresponding reproduction of a signal supplied by the sensor 41, assembly personnel can receive an immediate acknowledgment of successful assembly.

Figure 6:
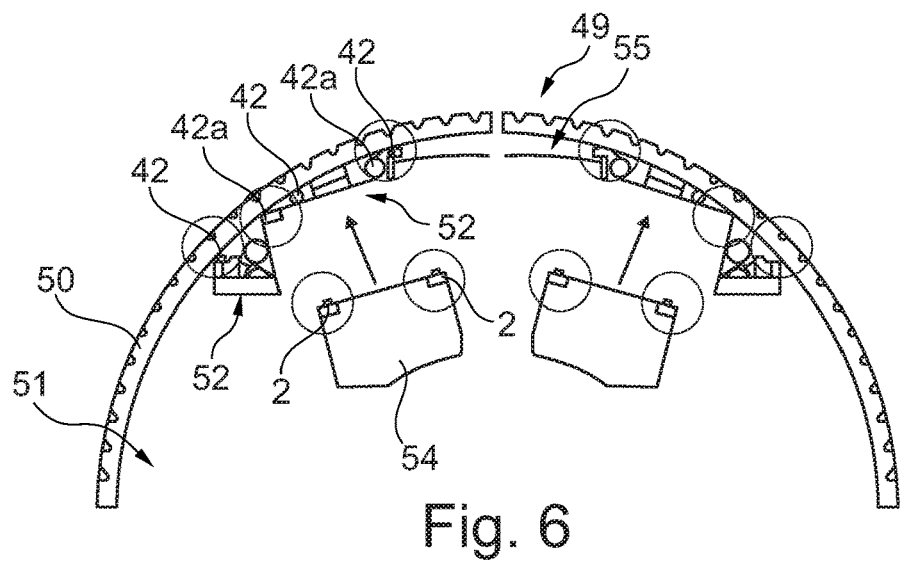
FIG. 6 shows an assembly process on an inside of a fuselage of an aircraft in two consecutive steps.

FIG. 6 shows an installation system 49 in part of a fuselage 50 of an aircraft to form a cabin 51. Multiple base elements 42 fastened to an inner side of the fuselage 50 can be seen here. Modules 52 which support multiple lines or electronic units provided for the cabin 51 or for aircraft functions are arranged on these base elements 42. Meanwhile, further base elements 42*a* which can be connected to holding devices 2 of built-in components 54 are arranged on the modules 52. The latter are, for example, depicted as overhead storage compartments. Consequently, in a first installation step, the modules 52 can be connected to the base elements 42 on the fuselage 50, wherein the other built-in components 54 are arranged on the additional base elements 42*a*.

Figure 7:
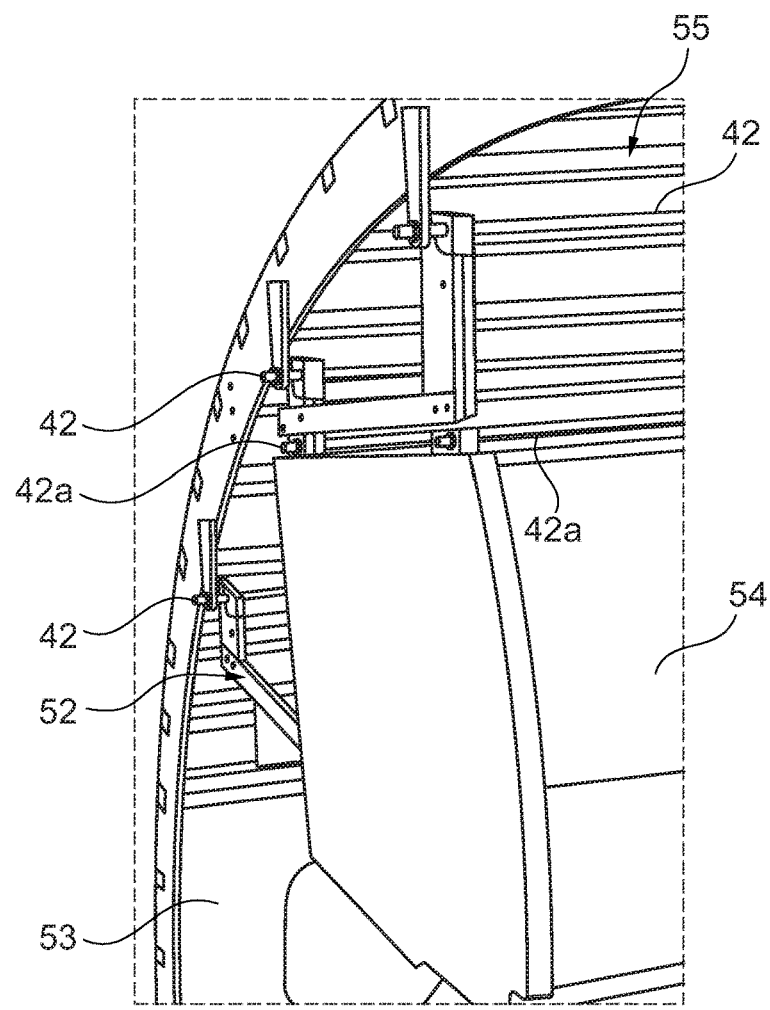
FIG. 7 shows an overhead storage compartment on an inside of a fuselage as a three-dimensional partial depiction.

FIG. 7 shows a three-dimensional, schematic depiction of an overhead storage compartment 54 which is fastened to modules 52 on an inside of the fuselage 50 in a ceiling region 55. Furthermore, it would also be conceivable for base elements 42 to be arranged on side walls 53 and/or on the floor 60, in order to fasten built-in components thereto.

Figure 8A:
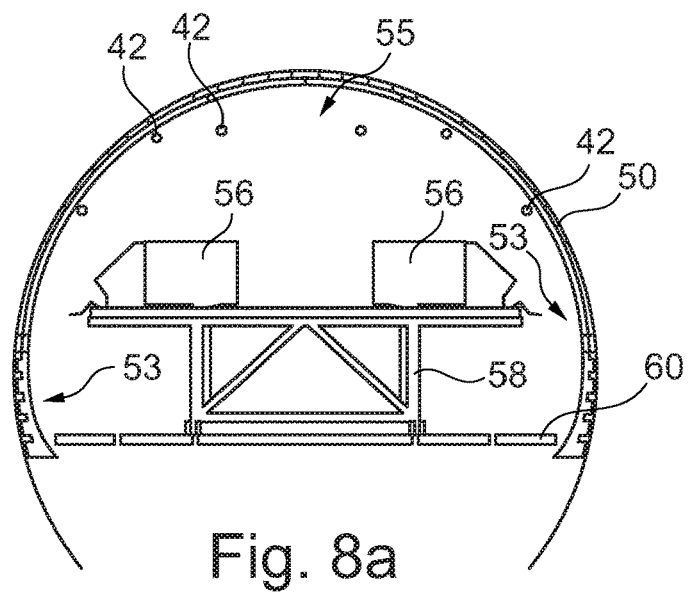
FIGS. 8a and 8b show an automated assembly process in two consecutive steps.
Figure 8B:
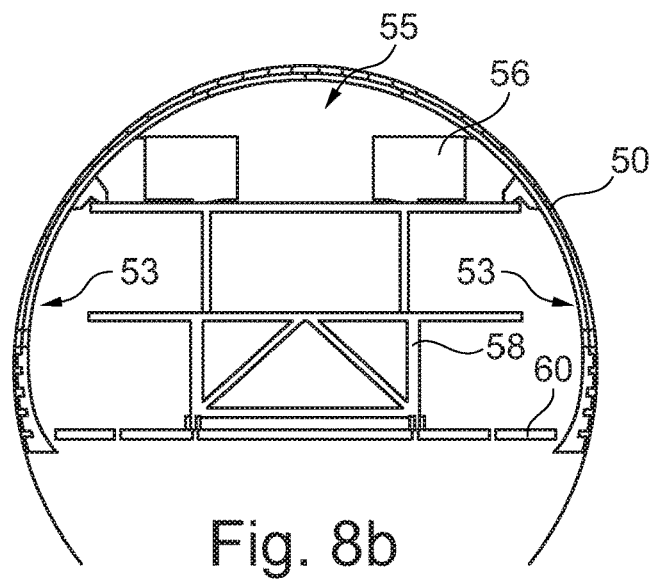

An automated assembly of built-in components 56 is shown schematically in FIG. 8*a*. These can be inserted into a fuselage 50 on a carrier 58 on a floor 60, so that the built-in components 56 can be fastened to base elements 42 on the inside of the fuselage 50 by lifting the carrier 58.

Figure 9:
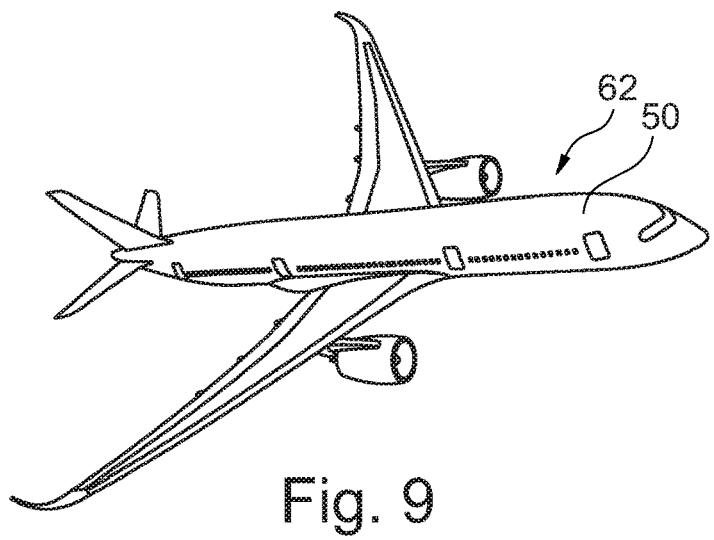
FIG. 9 shows an aircraft.

Finally, FIG. 9 shows an aircraft 60 with an aircraft fuselage 50 which is equipped with an installation system 49 of this kind.

In addition, it should be pointed out that "comprising" does not preclude other elements or steps and "a" or "an" does not preclude a plurality. In addition, it should be pointed out that features which have been described with reference to one of the above exemplary embodiments can also be used in combination with other features of other exemplary embodiments described above. Reference numbers in the claims should not be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMBERS 2 holding device
4 clamping unit
6 first clamping member
8 second clamping member
10 first pivot axle
12 first end
14 second end
16 straight portion/closing lever
18 curved portion
20 base
22 first spring unit
24 second pivot axle
26 second spring unit
28 abutment
30 receiving space
32 guiding limb
34 guiding limb
36 latching lug
38 sensor mechanism
40 sensor mechanism
41 sensor
42 base element
44 opening
46 first latching elements
48 second latching elements
49 installation system
50 fuselage
51 cabin
52 module
53 side wall
54 built-in component/overhead storage compartment
55 ceiling region
56 built-in component
58 carrier
60 floor
62 aircraft

The invention claimed is:

1. An installation system for a cabin of a vehicle, comprising:
at least one built-in component for installation in the cabin;
multiple base elements for arrangement on a structurally fixed component of the vehicle; and
multiple holding devices configured to be connected to the at least one built-in component,
wherein the holding devices each comprises a clamping unit with receiving space defined by at least two clamping members, wherein the receiving space is configured to be moved between an open and a closed state through movement of at least one of the clamping members in the direction of the other clamping member in each case, and
wherein the clamping unit is configured to move the at least one clamping member by pressing the clamping unit onto a base element when the receiving space is in the open state and thereby closing the receiving space including the base element,
wherein the at least one clamping member is pivotably mounted and coupled to a spring unit,
wherein the at least one clamping member is configured to be moved into a first pivot position and a second pivot position opposite the first pivot position, and
wherein a mechanism formed from the spring unit and the at least one clamping member has a dead centre between the first pivot position and the second pivot position, so that the spring unit displaces the at least one clamping member into the first or second pivot position, depending on a position of the at least one clamping member relative to the dead centre.

2. The installation system according to claim 1, wherein the clamping unit comprises a sensor configured to detect the closed state of the clamping unit.

3. The installation system according to claim 1, wherein the clamping members are configured to latch with one another in the closed state of the receiving space.

4. The installation system according to claim 1,
wherein the at least one clamping member comprises a closing lever projecting into the receiving space when said receiving space is in the open state, and
the closing lever is configured to be pressed out of the receiving space when the clamping unit is pressed by the base element and thereby move the at least one clamping member to close the clamping unit.

5. The installation system according to claim 1,
wherein the at least one clamping member is pivotably mounted about a pivot axle, and
the pivot axle is spaced apart from two ends opposite one another of the at least one clamping member.

6. The installation system according to claim 1, wherein the base element is an elongate, or bar component.

7. The installation system according to claim 1, wherein the built-in component comprises an overhead storage compartment.

8. A cabin of a vehicle comprising:
a floor;
two walls opposite one another;
a ceiling region lying above the floor; and
an installation system according to claim 1,
wherein the base elements are arranged on the floor, the walls and/or the ceiling region.

9. The cabin according to claim 8,
wherein the base elements are arranged on the ceiling region and support modules, and
the support modules comprise further base elements and support overhead storage compartments.

10. A vehicle comprising a cabin according to claim 8.

11. The vehicle according to claim 10, wherein the vehicle is an aircraft.

* * * * *